United States Patent
Salakari

(10) Patent No.: US 7,032,636 B2
(45) Date of Patent: Apr. 25, 2006

(54) STUD FOR A TYRE

(75) Inventor: Heikki Salakari, Lielax (FI)

(73) Assignee: Turvanasta Development OY, Turku (FI)

(*) Notice: Subject to any disclaimer, the term of this patent is extended or adjusted under 35 U.S.C. 154(b) by 211 days.

(21) Appl. No.: 10/471,003

(22) PCT Filed: Mar. 7, 2002

(86) PCT No.: PCT/FI02/00176

§ 371 (c)(1),
(2), (4) Date: Sep. 8, 2003

(87) PCT Pub. No.: WO02/070287

PCT Pub. Date: Sep. 12, 2002

(65) Prior Publication Data

US 2004/0079461 A1    Apr. 29, 2004

(30) Foreign Application Priority Data

Mar. 8, 2001    (FI) .................................. 20010460

(51) Int. Cl.
*B60C 11/16* (2006.01)

(52) U.S. Cl. .................................................... 152/210
(58) Field of Classification Search ................ 152/210; 36/67 B See application file for complete search history.

(56) References Cited

U.S. PATENT DOCUMENTS

| 3,230,997 A | * | 1/1966 | Carlstedt ................... 152/210 |
| 3,396,772 A | * | 8/1968 | McCarroll ................... 152/210 |
| 3,464,476 A | * | 9/1969 | Scheuba et al. ............. 152/210 |
| 3,693,688 A | * | 9/1972 | Schuman ................... 152/210 |
| 3,831,655 A | | 8/1974 | Cantz |
| 4,844,137 A | | 7/1989 | Einarsson |

FOREIGN PATENT DOCUMENTS

| DE | 2 117 151 |   | 10/1972 |
| DE | 2351803 | * | 4/1975 |
| FI | 77409 |   | 11/1988 |
| FR | 2 753 134 |   | 3/1998 |
| FR | 2 775 934 |   | 9/1999 |
| JP | 62-139703 | * | 6/1987 |
| SU | 1533878 | * | 1/1990 |

* cited by examiner

*Primary Examiner*—Steven D. Maki
(74) *Attorney, Agent, or Firm*—Young & Thompson

(57) ABSTRACT

The invention relates to a stud for a tyre comprising a socket-formed body portion (1), having at one end a hard metal peak (2) and at its other end a locking flange (3) retaining the stud in the tyre and being made of a light injection-mouldable material, such as plastic, the body portion (1) having a pin (4) extending towards the locking flange, with the tubular sleeve portion (5) of the locking flange fixed on top of this pin. The body portion (1) is conical so as to be clamped as a wedge into the corresponding conical sleeve portion (5).

15 Claims, 1 Drawing Sheet

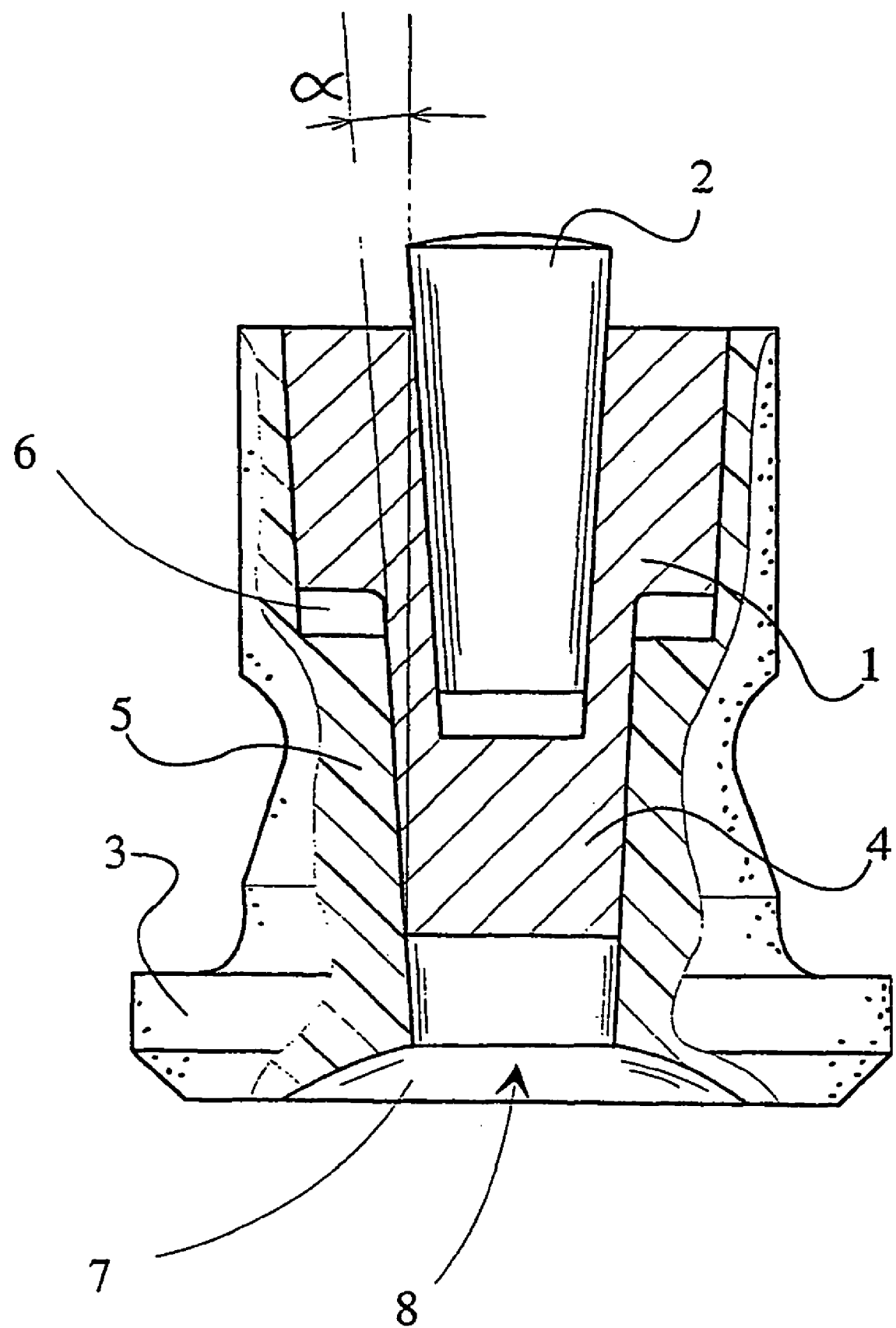

STUD FOR A TYRE

BACKGROUND OF THE INVENTION

The invention relates to a stud for a tyre comprising a socket-formed body portion having at one end a hard metal peak and at the other end a locking flange retaining the stud in the tyre, and being formed of a light material such as plastic, the body portion having a pin extending towards the locking flange, with the tubular sleeve portion of the locking flange fixed on top of this pin.

DESCRIPTION OF THE RELATED ART

As a rule, manufacturers of winter tyres seek to reduce tyre material, i.e. rubber mass, in order to achieve reduced weight of the mass that is without suspension in the car and thus enhanced road-holding characteristics. Winter tyres equipped with lighter studs also cause less wear to the road surface material. As a result of the manufacture of lighter winter tyres, the stud-locking flange gets very close to the ply within a winter tyre. There is a distance of only 2–3 mm between the stud-locking flange and the ply. As a result of this, again, the edge of the stud-locking flange has entailed such heavy wear of the tyre rubber under the tilting movements of the stud that the internal ply has been damaged and even the tyre punctured.

There have been constant efforts to provide a stud solution that is durable while being as light as possible. Plastic and aluminium studs are known, but they have poorer resistance than studs with a steel body.

Gravel and asphalt dust cause very rapid wear of the plastic or aluminium body surrounding the hard metal peak, so that the hard metal peak may easily come off.

Such studs have been disclosed e.g. by FI patent specification 77409 and U.S. Pat. No. 3,831,655. The stud described in FI patent specification 77409 is constituted of a metal stud body, around which a collar portion has been attached, with the stud flange portion formed at the lower end of the collar portion. This type of stud involves the problem of the metal stud body being strongly tapered towards the stud flange portion. When the stud is then subjected to pressure in a direction parallel to the vertical axis of the stud, the metal stud body will act as a wedge that causes enlargement of the plastic collar portion. In the course of time, the plastic collar portion will be enlarged to an extent such that the metal stud body is detached from the collar portion.

U.S. Pat. No. 3,831,655 discloses a stud, in which a shank portion made of metal has been connected to the bottom portion made of an elastic material either by mechanical joining, gluing or vulcanising. In this stud model, the shank portion is clearly narrower than the bottom portion, so that the same apparatus intended for mounting conventional studs cannot be used for mounting this stud. The elastic material of the bottom portion of the stud does not extend over the shank portion at all, or does so only over a short distance. This results in low friction between the stud and the tyre, so that the stud may be detached from the tyre.

SUMMARY OF THE INVENTION

The purpose of the invention is to provide a stud of a new type, which is both resistant and light. The stud of the invention is characterised by the body portion being conical, so that it is clamped as a wedge into the corresponding conical sleeve portion.

The invention provides a very lightweight stud with adequate durability characteristics. The weight of the stud may be even less than half of the weight of a steel stud of equal size. The stud causes less wear to the road surface. The stud is more silent, since it has lighter weight. The flexible locking flange is substantially retained in position despite the tilting of the stud. Since the actual appearance and dimensions of the stud do not differ from those of conventional steel studs, the studs can be fixed in the tyres using existing operational equipment. Given the small size of the metal body portion, there will be very low waste percentage of raw material if the manufacture is carried out using turning. In addition, the plastic part has proved to withstand abrasion against rubber better than a steel stud, and consequently the stud is better retained in the tyre.

Various embodiments of the invention are defined in the dependent claims of the set of claims. The locking flange can receive forces exerted on the hard metal peak of the stud, especially when the road surface is molten and the stud peak cannot bite into the snow mass or the ice surface.

BRIEF DESCRIPTION OF THE DRAWINGS

The invention is explained below by means of examples and with reference to the accompanying drawing, whose FIGURE shows the stud in partial cross-section.

DESCRIPTION OF THE PREFERRED EMBODIMENTS

The stud consists of a socket-formed body portion 1, having a hard metal peak 2 at one end. At its other end, the body has a locking flange 3 retaining the stud in the tyre. The locking flange 3 is made of plastic. The stud body portion 1 has a pin 4 extending towards the locking pin, the tubular sleeve portion 5 of the locking flange being fixed on top of this pin. The body portion 1 is conical so as to be clamped as a wedge into the corresponding conical sleeve portion 5. The body portion 1 has a graded conical surface, its diameter being larger at the hard metal peak 2 than its end 4 at the locking flange 3. At the graded location of the conical surface of the body portion 1 and the conical surface of the sleeve portion 5, there is a hollow annular space 6, which allows the body portion 1 to be wedged deeper when pressing forces are exerted on the stud. The graded feature prevents the body portion 1, if loosened, from being unintentionally pressed into the tyre of the vehicle and causing puncture of this. The end of the sleeve portion 5 is open at the locking flange so as to allow the body portion 1 to be wedged into it. The locking flange 3 has a convex recess 7 on its outer surface. The conical angle α relative to the central axis is 3°.

The outer surface of the sleeve portion 5 may be roughened.

The body portion 1 of the stud is not necessarily graded, it may equally well be an even cone, however, in that case, the open space 8 requires a collar to prevent the body portion from being pressed through the sleeve portion 5 into the tyre of the vehicle.

The invention claimed is:

1. A stud for a tyre comprising a socket-formed body portion (1) having at one end a hard metal peak (2); and at the other end a locking flange (3) retaining the stud in the tyre and being made of a light material such as plastic, the body portion (1) having a pin (4) extending towards the locking flange, with a tubular sleeve portion (5) having a conical surface and being fixed on top of the locking flange, characterised in that the body portion (1) is conical over substantially its entire length with an ever-decreasing diameter so as to be clamped as a wedge into the tubular sleeve portion (5).

2. A stud as defined in claim 1, characterised in that the conical surface of the body portion (1) is graded so that its diameter is larger at the hard metal peak than its end (4) at the locking flange (3).

3. A stud as defined in claim 1, characterised in having a hollow annular space (6) at a graded location between the conical surface of the conical the body portion (1) and the conical surface of the sleeve portion (5).

4. A stud as defined in claim 1, characterised in that the end of the sleeve portion (5) is open at the locking flange (3).

5. A stud as defined in claim 1, characterised in having a concave recess (7) known per se on the outer surface of the locking flange (3).

6. A stud as defined in claim 1, characterised in that the conical angle relative to the central axis for the conical surface of the body portion is 3°.

7. A stud as defined in claim 1, characterised in that the outer surface of the sleeve portion (5) is roughened.

8. A stud as defined in claim 2, characterised in having a hollow annular space (6) at a graded location between the conical surface of the body portion (1) and the conical surface of the sleeve portion (5).

9. A tire stud, comprising:
- an ever-decreasing diameter socket-formed body portion (1) having a shoulder providing a planar surface separating a first, lower conical pin (4) part of reduced diameter from a second, upper part of increased diameter;
- a hard metal peak (2) inserted in a first end of the body portion within the second, upper part and extending into the first, lower pin part;
- a plastic locking flange (3) to retain the stud in a tire;
- a tubular sleeve portion (5) retaining the body portion with the body portion wedged into the sleeve portion; and
- a hollow annular space (6) between the planar surface of the body portion and an internal step portion of the sleeve portion.

10. A tire stud, comprising:
- a socket-formed body portion (1) having a shoulder providing a planar surface separating a first conical pin (4) part of reduced diameter from a second part of increased diameter;
- a hard metal peak (2) inserted in a first end of the body portion within the second part and extending into the first pin part;
- a light-weight locking flange (3) to retain the stud in a tire;
- a tubular sleeve portion (5) retaining the body portion with the body portion wedged into the sleeve portion; and
- a hollow annular space (6) between the planar surface of the body portion and an internal step portion of the sleeve portion.

11. The tire stud of claim 10, wherein, the locking flange (3) comprises a convex recess (7) on an outer surface.

12. The tire stud of claim 10, wherein, a conical angle ($\alpha$) of the pin part relative to a central axis of the body portion is 3°.

13. The tire stud of claim 10, wherein, the outer surface of the sleeve portion (5) is roughened.

14. The tire stud of claim 10, wherein the second part of the body portion (1) is non-graded.

15. The tire stud of claim 10, wherein the light-weight locking flange (3) is plastic.

* * * * *